(12) United States Patent
Martens et al.

(10) Patent No.: US 8,129,012 B2
(45) Date of Patent: Mar. 6, 2012

(54) WRITE-ONCE OPTICAL RECORD CARRIER FOR HIGH-SPEED RECORDING

(75) Inventors: Hubert Céçile François Martens, Eindhoven (NL); Benno Tieke, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 618 days.

(21) Appl. No.: 10/555,393

(22) PCT Filed: Apr. 28, 2004

(86) PCT No.: PCT/IB2004/050542
§ 371 (c)(1),
(2), (4) Date: Nov. 2, 2005

(87) PCT Pub. No.: WO2004/100140
PCT Pub. Date: Nov. 18, 2004

(65) Prior Publication Data
US 2006/0222807 A1    Oct. 5, 2006

(30) Foreign Application Priority Data
May 7, 2003    (EP) .................................... 03101257

(51) Int. Cl.
*B32B 3/02* (2006.01)
(52) U.S. Cl. ..................... 428/64.1; 428/64.4; 428/64.8; 430/270.14
(58) Field of Classification Search .................. 428/64.8; 430/270.14
See application file for complete search history.

(56) References Cited

U.S. PATENT DOCUMENTS

| | | | |
|---|---|---|---|
| 5,328,741 A * | 7/1994 | Yanagisawa et al. ........ | 428/64.8 |
| 5,328,802 A * | 7/1994 | Yanagisawa et al. .... | 430/270.19 |
| 5,336,584 A * | 8/1994 | Yanagisawa et al. .... | 430/270.19 |
| 5,419,939 A | 5/1995 | Arioka et al. | |
| 5,718,961 A | 2/1998 | Hong | |
| 5,851,621 A * | 12/1998 | Wolleb et al. ................ | 428/64.1 |
| 6,103,331 A | 8/2000 | Kanno | |
| 6,143,469 A | 11/2000 | Ohta et al. | |
| 6,228,455 B1 | 5/2001 | Huang et al. | |

(Continued)

FOREIGN PATENT DOCUMENTS

EP    0924693 A    6/1999

(Continued)

OTHER PUBLICATIONS

ISR: PCT/IB04/050542.

(Continued)

*Primary Examiner* — Elizabeth Mulvaney

(57) ABSTRACT

The present invention relates to a write-once optical record carrier for high speed recording, in particular to a DVD+R disc. Such a record carrier comprises in general at least a substrate layer (3), a recording layer (2) of an organic dye material on top of the substrate layer (3) and a metal reflective layer (1) on top of the recording layer (2). In order to obtain a less steep temperature gradient at the interface between the recording layer (2) and the reflective layer (1) and thus to prevent mechanical stress leading to a delamination problem it is proposed to reduce the thickness of the metal reflective layer (1) to a range below 75 nm. A dielectric layer of a thickness below 50 nm between the recording layer (2) and the metal reflective layer (1) is also enclosed.

13 Claims, 4 Drawing Sheets

U.S. PATENT DOCUMENTS

| | | |
|---|---|---|
| 6,600,717 B2 * | 7/2003 | Hayashida et al. .......... 369/286 |
| 6,844,044 B2 | 1/2005 | Sabi |
| 2002/0051941 A1 | 5/2002 | Shoda et al. |

FOREIGN PATENT DOCUMENTS

| | | | |
|---|---|---|---|
| JP | 2087342 A | 3/1990 | |
| JP | 03178050 A | 10/1991 | |
| JP | 04252440 | 9/1992 | |
| JP | 04252441 | 9/1992 | |
| JP | 4252441 A | 9/1992 | |
| JP | 05250728 | 9/1993 | |
| JP | 6195746 A | 7/1994 | |
| WO | 02101735 A1 | 12/2002 | |

OTHER PUBLICATIONS

Written Opinion: PCT/IB04/050542.

* cited by examiner

WRITE-ONCE OPTICAL RECORD CARRIER FOR HIGH-SPEED RECORDING

The present invention relates to a write-once optical record carrier, such as a DVD+R, in particular to a single-layer DVD+R, which is adapted for high-speed recording of data thereon.

At present, the development of a high-speed DVD+R standard has a high priority. Current dye-based high-speed DVD+R media exhibit reasonable performance up to 4× or even 6×. The power margins, however, are getting more and more narrow at higher speeds. It is believed that at the high powers required for high-speed recording delamination occurs at the dye-metal interface, i.e. at the interface between the recording layer made of an organic dye material and a metal reflective layer provided for cooling of the recording layer. These problems raise concerns about the possibility to achieve higher recording speeds with write-once optical record carriers, in particular DVD+R media, comprising a recording layer made of an organic dye material. However, the use of dyes is considered favourable because of the backwards compatibility of recorded disc on existing players due to the dye's intrinsic high transparency which allows (together with a reflector layer) a high reflectivity disc.

The thickness of the metal reflective layer is usually around 100 nm. An important effect of the presence of the metal reflective layer is its large cooling power, i.e. its high heat capacity. It is thus believed that a reduction of the thickness of the metal reflective layer will result in a less efficient cooling of the dye recording layer. Since the dye has only a very poor heat conduction, the efficient cooling by the metal reflective layer induces a large temperature gradient near the interface between the recording layer and the metal reflective layer. It is possible that mechanical stress that may result from this steep gradient leads to the above-mentioned delamination problem.

U.S. Pat. No. 5,718,961 discloses a phase-change type optical disc in which a first dielectric film, a second dielectric film, a recording film and a reflective film are sequentially stacked on a substrate. The thickness of the reflective layer can be in a broad range of 10 to 120 nm. By use of ZnO—BN as material for the first and second dielectric film a high recording sensitivity and thermal stability can be achieved, and heat produced during recording can be rapidly dissipated to the reflective layer.

It is an object of the present invention to provide a write-once optical record carrier which allows higher recording speeds but has a reduced temperature gradient at the interface between the recording layer and the metal reflective layer to avoid mechanical problems such as delamination.

This object is achieved according to the present invention by a write-once optical record carrier as claimed in claim 1 comprising:
a substrate layer,
a recording layer of an organic dye material on top of the substrate layer and
a metal reflective layer of a thickness below 75 nm on top of the recording layer.

The invention is based on the finding that, contrary to common believe, a reduction of the thickness of the metal reflective layer can be advantageous. It has been found that by a reduction of the thickness, the cooling becomes less efficient, which, however, leads in consequence to a temperature gradient at the interface between the recording layer and the metal reflective layer which is more gradual. This will reduce mechanical stress and thereby prevent delamination. It has thus been recognized that a deterioration of the cooling in the recording stack may actually improve the high-speed recording performance. This means that by this invention it is proposed to do the opposite from what experts in this field commonly believe both for record carriers having a recording layer made of an organic dye material or made of a phase-change material.

Preferred embodiments of the invention are defined in the dependent claims. While an improvement of the high-speed recording performance can be achieved by a metal reflective layer thickness below 75 nm, a further improvement can be achieved by reducing the thickness even more below 50 nm, in particular below 30 nm.

According to another preferred embodiment an additional dielectric layer is provided between the recording layer and the metal reflective layer. This dielectric layer acts as a thermal barrier and can mimic the reduced heat-sink capability of the reflective layer. The introduction of the additional dielectric layer, e.g. $SiO_2$, $ZnS$, $ZnS$—$SiO_2$ mixture (e.g. 8:2), $TiO_2$ or an other dielectric material, slightly enhances the reflection of the recording stack at the cost of reduced absorption. However, it can be foreseen further, to use a thinner recording layer which usually has a thickness of 100 nm, or a dye having a higher k value, k being the imaginary part of the complex refractive index, in order to compensate this.

Optionally, another dielectric layer can be provided between the recording layer and the substrate layer, in particular to improve stability of the whole recording stack. At least the first dielectric layer between the recording layer and the metal reflective layer has a thickness below 50 nm, in particular below 25 nm.

A preferred material for the metal reflective layer substantially consists of silver (Ag). However, other materials such as Al, Au or other metals can be used as well.

The invention will now be explained in more detail with reference to the drawings, in which.

Figure 1:
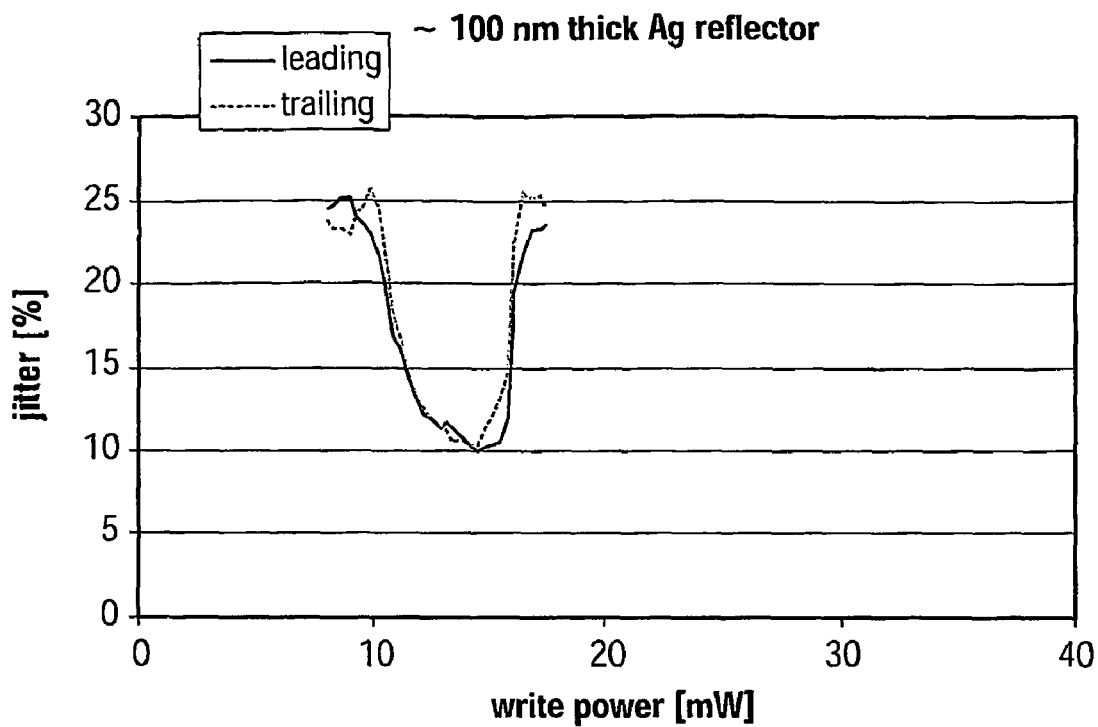
FIG. 1 shows power margins for a DVD+R disc with a 100 nm Ag layer.
Figure 2:
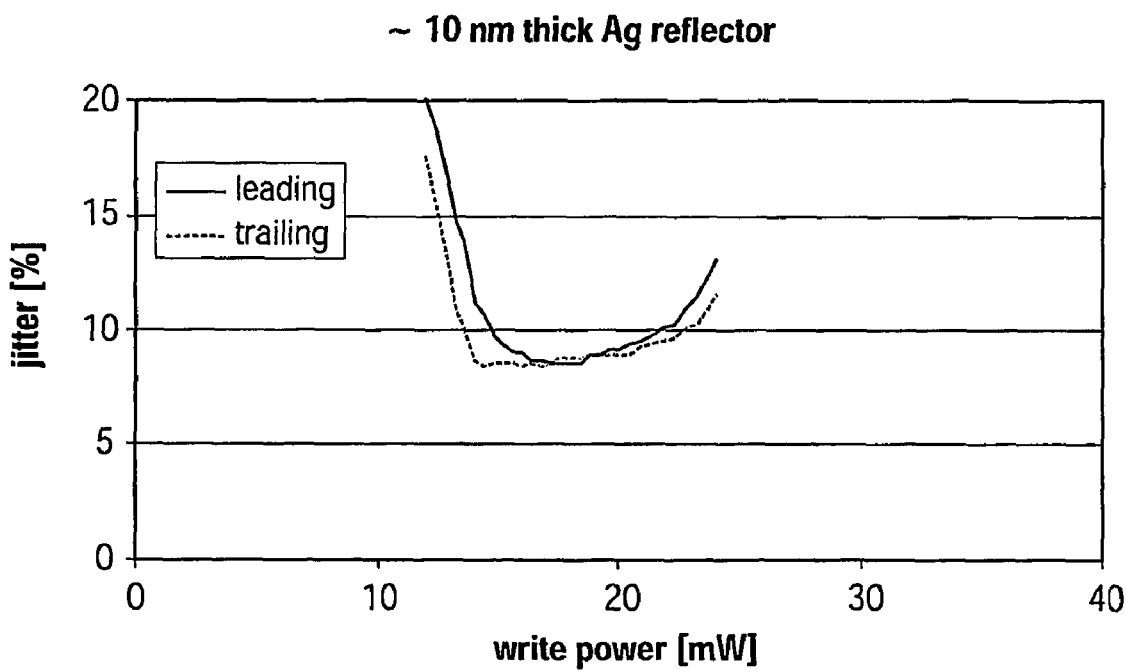
FIG. 2 shows power margins for a DVD+R disc with a 10 nm Ag layer.

FIG. 1 shows a typical power margin in case of a thick reflective layer, in particular a 100 nm Ag layer, in a DVD+R disc. Shown is the jitter in percentage over write power in mW for leading and trailing edges of bits to be recorded on the disc. This power margin needs to be compared to the power margin for a thin reflective layer shown in FIG. 2 where the reflective layer made of Ag in a DVD+R has a thickness of 10 nm. As can be seen the jitter is much lower in a broader range of write powers, in particular for higher write powers compared to the jitter achieved with the thick reflective layer shown in FIG. 1.

Figure 3A:
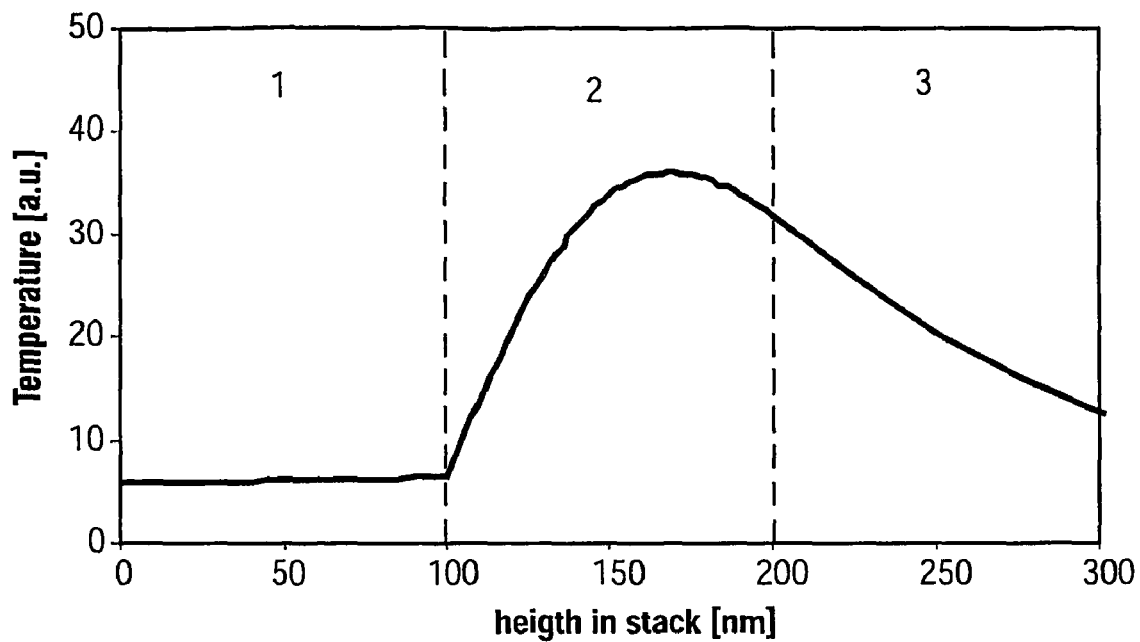
FIG. 3a shows the temperature distribution after applying a DC-power level to a conventional write-once record carrier.

The temperature distribution after applying a dc-power level to a conventional DVD+R recording stack having a thick reflective layer 1 made of Ag (100 nm), a dye recording layer 2 (100 nm) and a polycarbonate substrate layer 3 (100 nm) is shown in FIG. 3a Not shown in FIG. 3a is the dummy substrate that is glued by means of a UV-curable lacquer on top of the thick reflective layer. Since the dye material has very poor heat conduction, the efficient cooling by the reflective layer 1 induces a large temperature gradient near the interface between the reflective layer 1 and the recording layer 2. From this steep gradient mechanical stress may result which may lead to delamination at the interface between the reflective layer 1 and the recording layer 2.

Figure 3B:
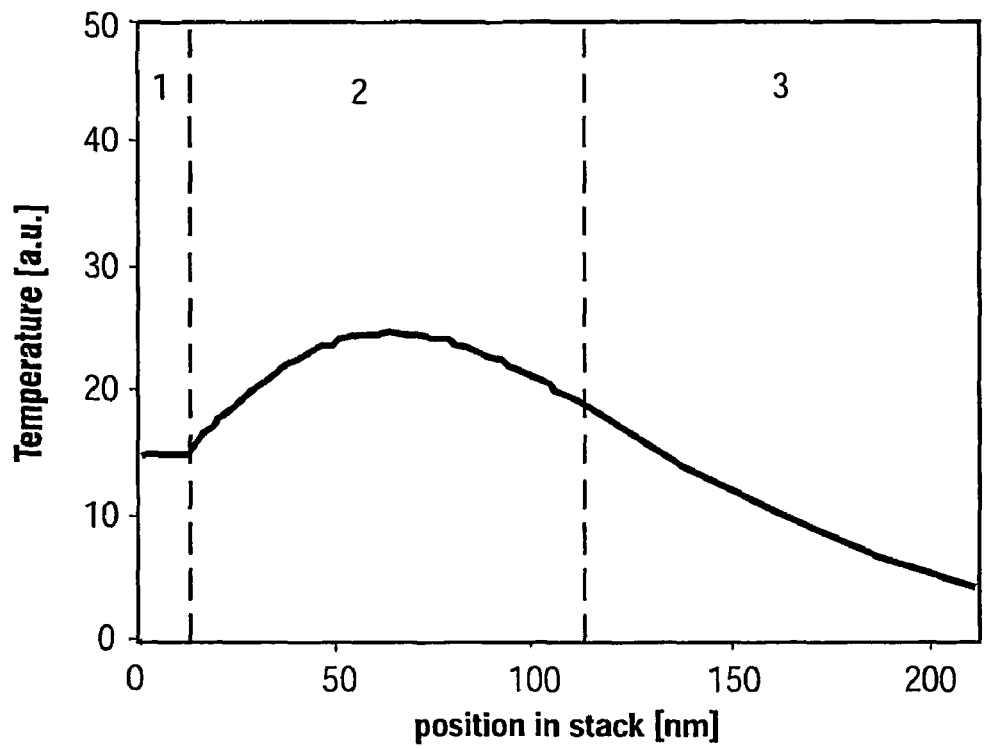
FIG. 3b shows the temperature distribution after applying a DC-power level to a write-once optical record carrier according to the present invention.

By reducing the thickness of the reflective layer 1, the cooling becomes less efficient, but advantageously as a consequence the temperature gradient becomes more gradual as can be seen from FIG. 3b where the temperature distribution after applying a DC-power level to a first embodiment of a record carrier according to the present invention is shown. Here the reflective layer has a thickness of approximately 10 nm and is made of Ag.

Figure 4:
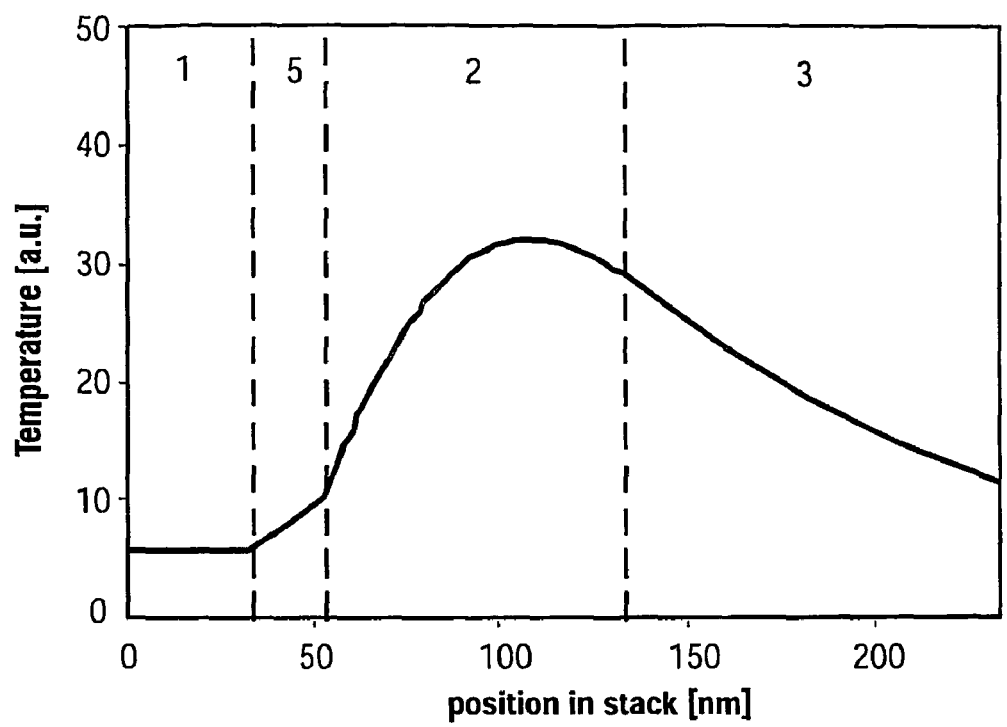
FIG. 4 shows the thermal distribution for another embodiment of a record carrier according to the invention.

The thermal distribution for a second embodiment of a record carrier according to the present invention is shown in FIG. 4. Therein, compared to the record carrier shown in FIG. 3a, an additional dielectric layer 5 made of $SiO_2$ having a thickness of 20 nm is provided between the reflective layer 1 having a thickness of 40 nm here and the recording layer 2. Not shown in FIG. 4 is the dummy substrate that is glued by means of a UV-curable lacquer on top of the 40 nm thick reflective layer. Further, the recording layer 2 has a reduced thickness of 80 nm which leads to a more efficient absorption as is apparent from the somewhat higher maximum temperature that is reached. The introduction of the additional dielectric layer 5 further reduces the temperature gradient between the reflective layer 1 and the recording layer 2, and thus reduces mechanical stress and prevents delamination.

Figure 5:
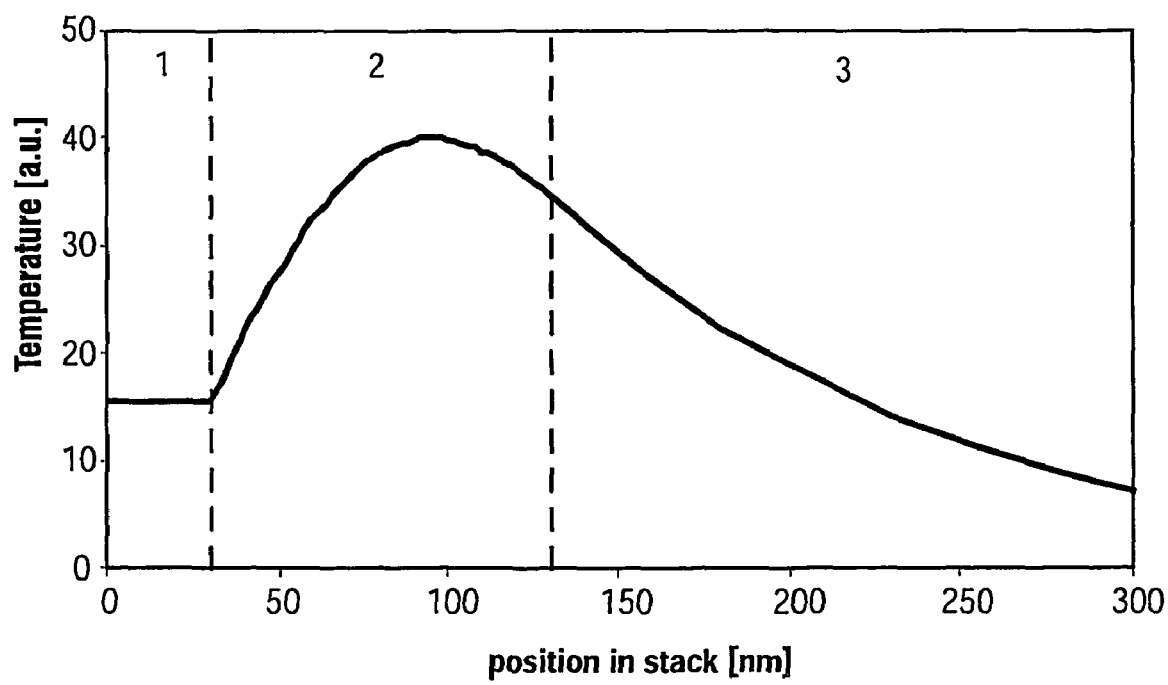
FIG. 5 shows the thermal distribution for still another embodiment of a record carrier according to the invention.

The thermal distribution for a third embodiment of a record carrier according to the present invention is shown in FIG. 5. Therein the reflective layer made of Ag has a thickness of 30 nm which still yields rather high reflection, but the thermal capacity is reduced by a factor of 3.3. Nevertheless, also in this embodiment the thermal gradient becomes less steep. Not shown in FIG. 5 is the dummy substrate that is glued by means of a UV-curable lacquer on top of the thick reflective layer.

Figure 6:
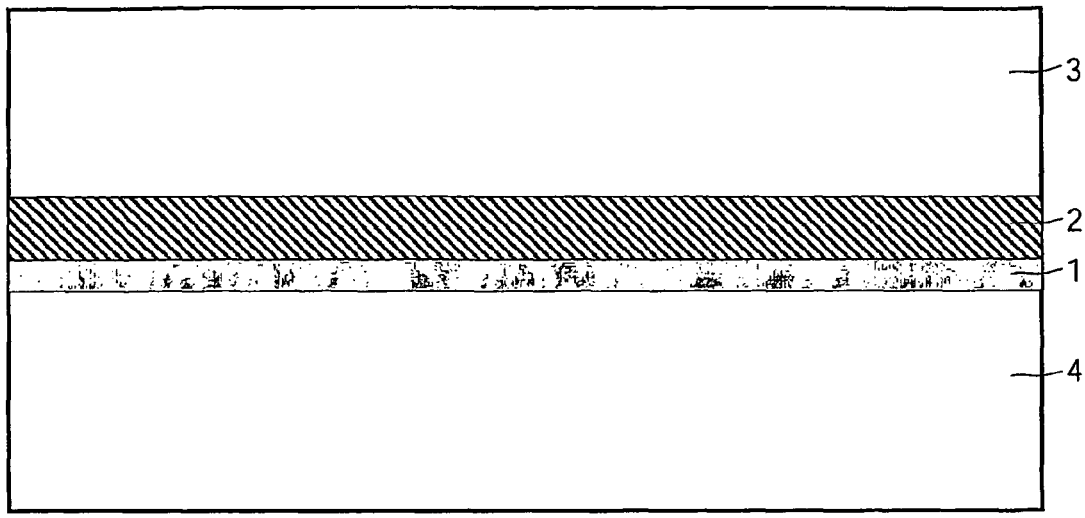
FIG. 6 shows a schematic layout of a first embodiment of a record carrier according to the invention.
Figure 7:
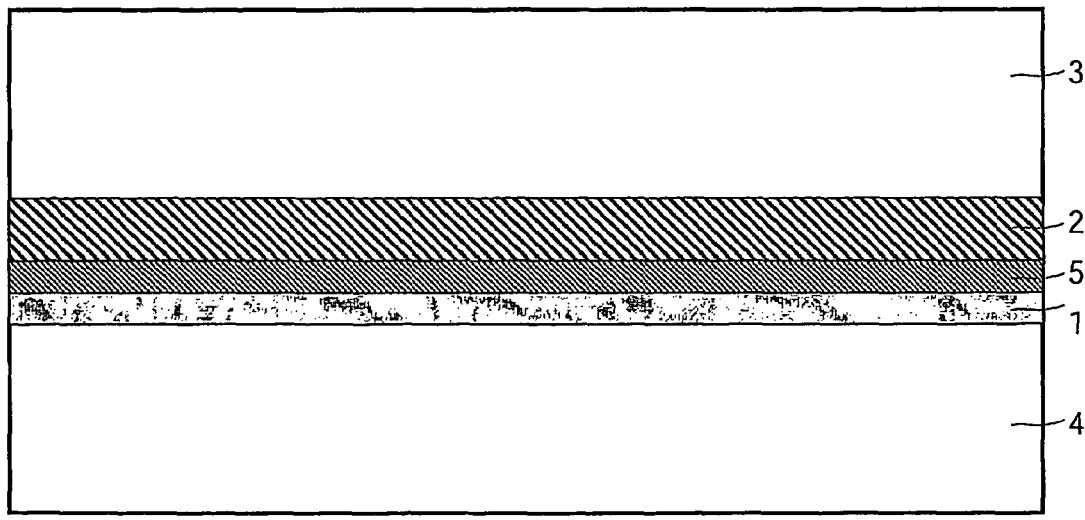
FIG. 7 shows a schematic layout of a second embodiment of a record carrier according to the invention.

FIGS. 6 and 7 schematically show two embodiments of record carriers according to the invention. FIG. 6 shows an embodiment for which the temperature profile is shown in FIG. 5. In addition to the three layers shown in FIG. 5, a second polycarbonate substrate layer 4 (about 0.6 mm) is shown, which is glued by means of a UV-curable lacquer on top of the reflective layer 1. FIG. 7 shows an embodiment for which the temperature profile is shown in FIG. 4. In addition to the 4 layers shown in FIG. 4, again a second polycarbonate substrate layer 4 (about 0.6 mm) is shown.

The embodiments shown in the figures are to be understood as examples. A number of further embodiments and further variations of the thicknesses of the different layers as well as the sequence and the provision of further layers is possible. The invention provides the advantage to get broader power margins for write-once optical record carriers, in particular for DVD+R media. Further, the possibility to go to higher recording speeds is available. In addition, thinner reflective layers cost less time to sputter, i.e. a faster fabrication is possible and a reduction of fabrication costs can be obtained.

The invention claimed is:

1. Write-once optical record carrier comprising:
   a first substrate layer;
   a recording layer of an organic dye material formed directly on top of the substrate layer; and
   a metal reflective layer of a thickness of less than 50 nm, on top of the recording layer; and
   a dielectric layer between said recording layer and said metal reflective layer;
   a second substrate layer glued directly to the metal reflective layer using a UV-curable lacquer.

2. The record carrier according to claim 1, wherein said dielectric layer is of a thickness below 50 nm.

3. The record carrier according to claim 1, wherein said metal reflective layer is substantially made of a material of the group consisting Ag, Al, Au.

4. The record carrier according to claim 1, wherein said metal reflective layer is substantially made of Ag.

5. The record carrier according to claim 1, wherein said dielectric layer is of a thickness below 25 nm.

6. The record carrier according to claim 1, wherein said dielectric layer is of a thickness of about 20 nm.

7. Write-once optical record carrier comprising:
   a first substrate layer;
   a recording layer of an organic dye material formed on top of the substrate layer; and
   a metal reflective layer of a thickness of less than 75 nm, on top of the recording layer;
   a second substrate layer glued directly to the metal reflective layer using a UV-curable lacquer.

8. The record carrier according to claim 7, wherein the second substrate layer is of a thickness of about 0.6 mm.

9. The record carrier according to claim 1 wherein the metal reflective layer is less than 50 nm thick.

10. The record carrier according to claim 1 wherein the metal reflective layer is less than 30 nm thick.

11. The record carrier according to claim 1 wherein the metal reflective layer is about 10 nm thick.

12. The record carrier of claim 1 wherein the composition of the dielectric layer consists of one or more of: $SiO_2$, ZnS, ZnO and $TiO_2$.

13. The recording layer of claim 1 wherein the dielectric layer comprises ZnO—BN.

* * * * *